Nov. 30, 1926. 1,608,921
A. BAIRD
POTTERY MOLDING MACHINE
Filed Nov. 15, 1924 3 Sheets-Sheet 1

INVENTOR.
Andrew Baird
BY
Rex Frye.
ATTORNEY.

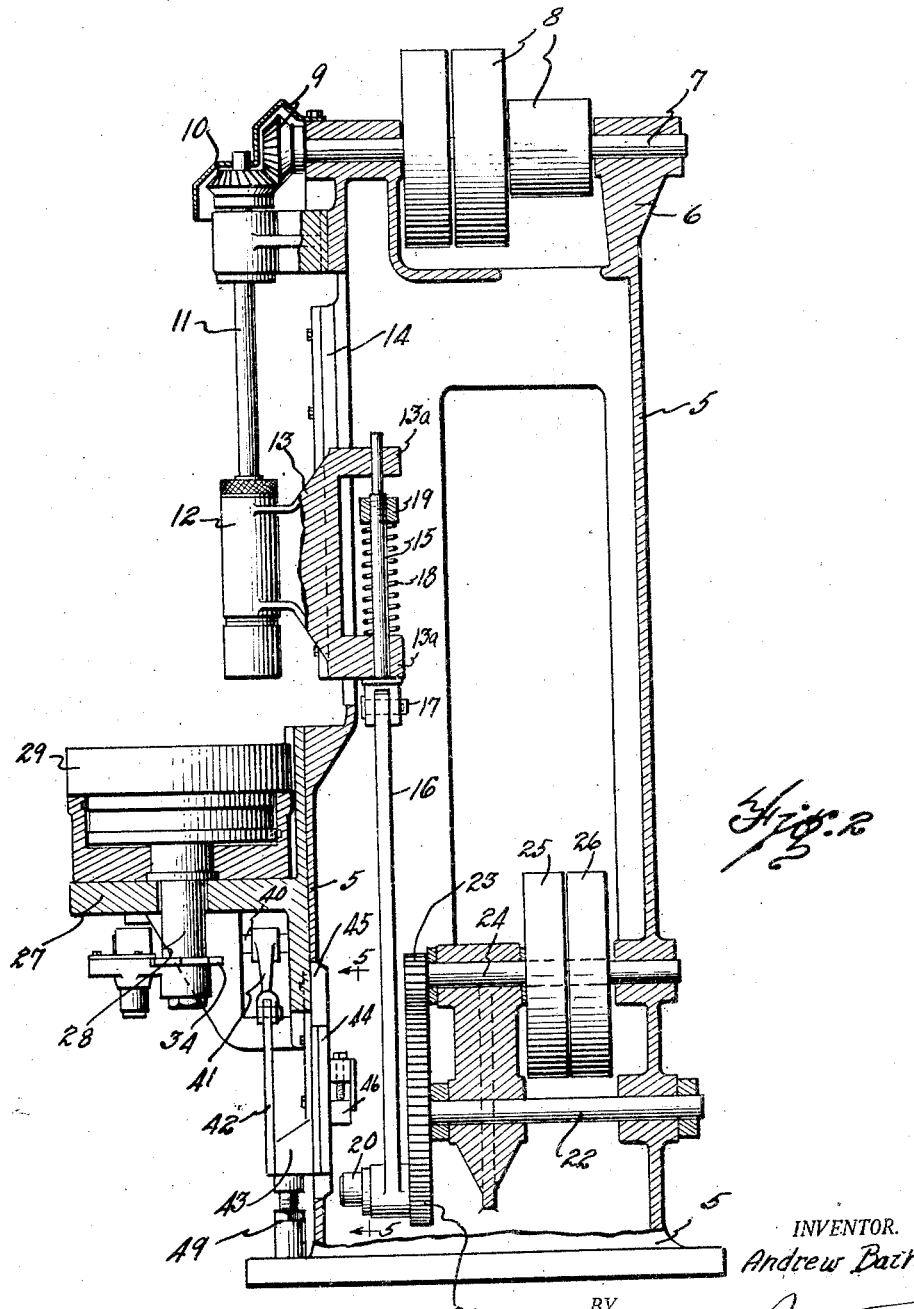

Nov. 30, 1926.
A. BAIRD
POTTERY MOLDING MACHINE
Filed Nov. 15, 1924
1,608,921
3 Sheets-Sheet 3
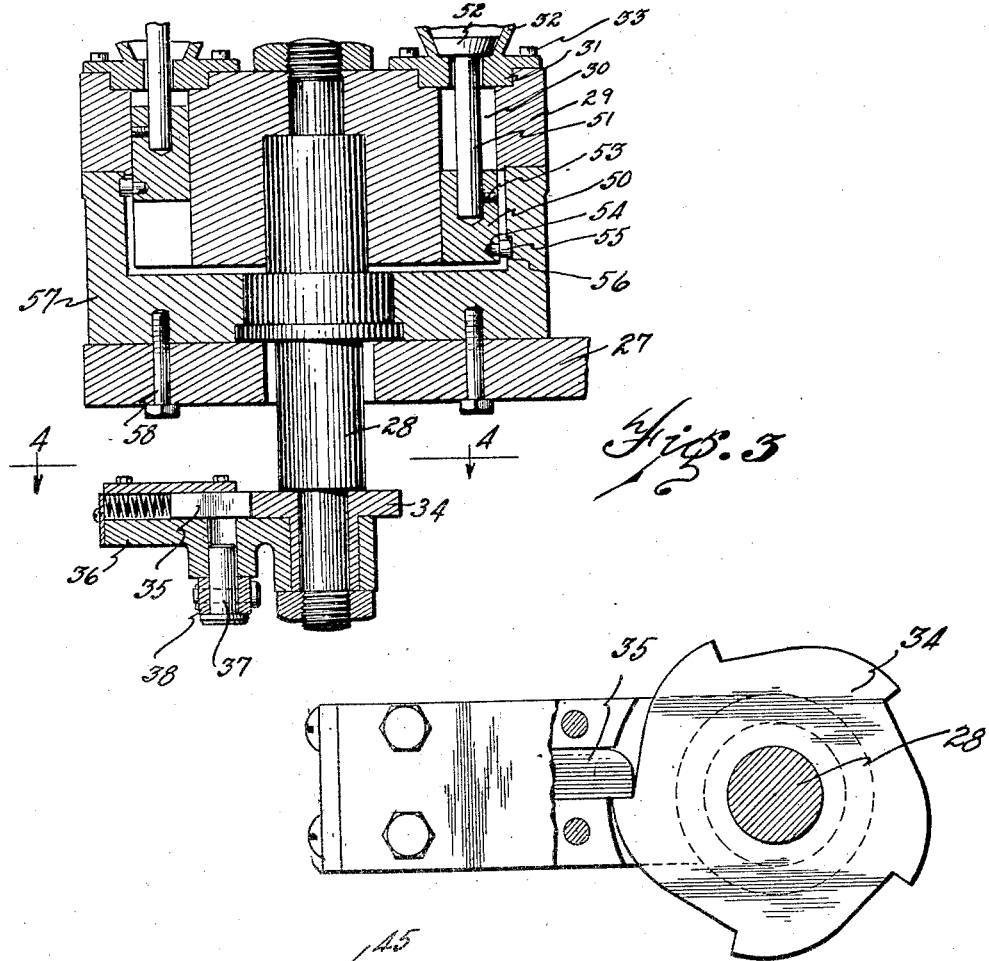
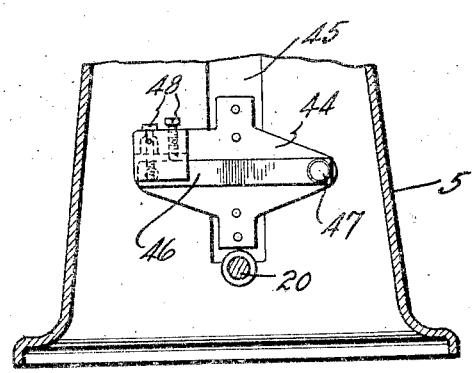
INVENTOR.
Andrew Baird
BY
Rex Frye.
ATTORNEY.

Patented Nov. 30, 1926.

1,608,921

UNITED STATES PATENT OFFICE.

ANDREW BAIRD, OF DETROIT, MICHIGAN.

POTTERY-MOLDING MACHINE.

Application filed November 15, 1924. Serial No. 750,110.

This invention relates to molding machines, and more particularly to the machines for molding pottery, insulators, crucibles and the like, from plastic or semi-plastic materials.

The principal object of the invention is the provision of a pottery molding machine having a plurality of molds arranged to be automatically advanced successively into position for co-operation with a rotating former and then retracted therefrom, whereby the placing of the plastic material into the molds and the removal of the formed articles therefrom may be performed at a distance from the path of travel of the rotating former.

Another object of the invention is the mounting of a multiple mold-carrying plate eccentrically beneath a vertically reciprocating former, with provisions for partially rotating the plate during the upward movement of the former to successively bring the molds into position for co-operation with the former.

A further object of the invention is the arrangement of ejecting means beneath each mold adapted to be automatically lifted and lowered as the mold plate is rotated.

Other objects and advantages will be apparent from the following description, wherein reference is made to the accompanying drawings illustrating a preferred embodiment of my invention and wherein similar reference numerals designate similar parts throughout the several views.

In the drawings:

Fig. 2 is a central vertical section therethrough.

Fig. 3 is an enlarged detail section through the mold-carrying plate and associated parts.

Fig. 4 is a detail cross section taken substantially on the line 4—4 of Fig. 3, and Fig. 5 is a detail vertical section taken substantially on the line 5—5 of Fig. 2.

Figure 1:
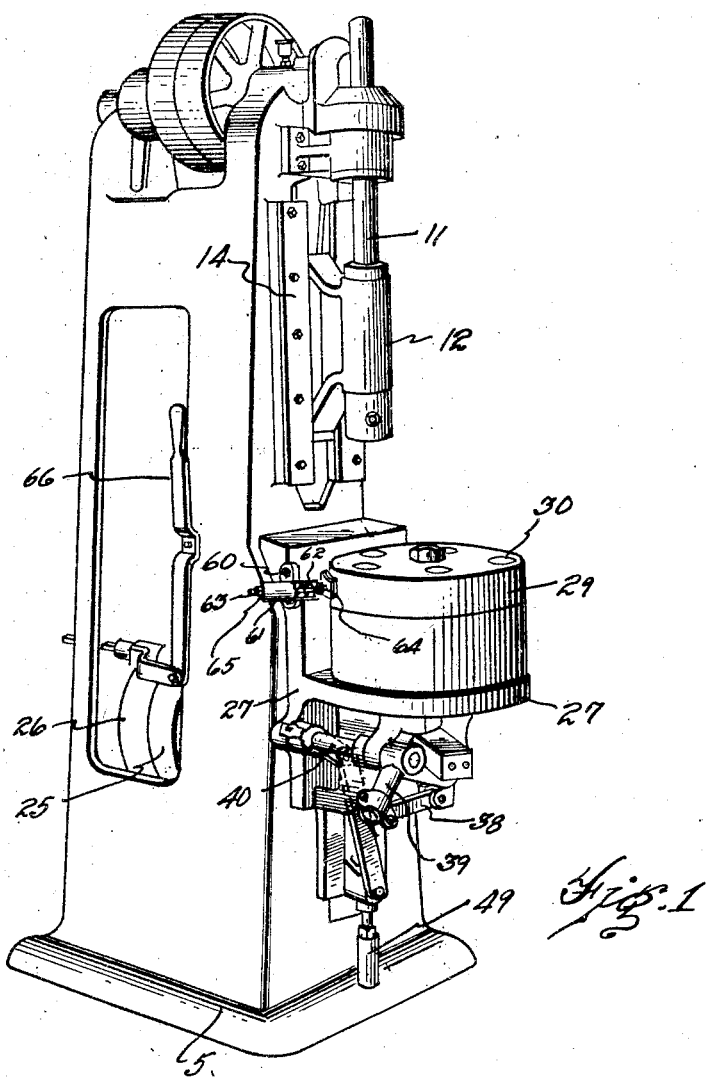
Fig. 1 is a perspective view of my improved pottery molding machine.

Referring now to the drawings, the numeral 5 designates the hollow casing carrying the various parts of my improved machine, and surmounted by bifurcations 6 in which the driving shaft 7 is journaled; the driving pulleys 8 being secured on this shaft. The forward extremity of the driving shaft 7 carries a bevel gear 9 adapted to mesh with the bevel gear 10 splined to the vertically disposed shaft 11 on which the former for shaping the articles from plastic material is detachably mounted, the arrangement being such that the shaft 11 is rotated with the bevel gear 10 but may also move relatively to the gear 10 during the reciprocating movements of the former as hereinafter described. The shaft 11 is journaled adjacent its lower extremity in the sleeve 12 of the traveler 13, which is arranged for vertically reciprocating motion between parallel guides 14 removably secured upon the front of the casing 5 and carries vertically spaced ears 13$^a$ apertured to receive the pin 15 through which connection is made to the connecting rod 16 for reciprocating the former and associated mechanism. As herein shown a pin 17 is journaled between apertured lugs on the pin 15 and the upper extremity of the connecting rod 16. A coil spring 18 is arranged between the lower lug 13$^a$ and a collar 19 adjustably mounted on the pin 15, whereby the pin 15 is normally held in raised position, while permitted to slide against spring tension whenever the former is in engagement with a mold or article therein. The lower end of the connecting rod 16 is journaled upon the crank pin 20 extending forwardly from the crank gear 21 fixed upon the shaft 22 mounted in suitable journals in the casing 5. The crank gear 21 is preferably driven by means of a pinion 23 fixed on a shaft 24 suitably mounted in journals in the casing 5 and carrying a pulley 25 adapted to be belt-driven from the driving pulleys 8 of the main shaft 7. An idler pulley 26 is also mounted adjacent the pulley 25 so that the shifting of the belt to the idler pulley will serve to terminate the driving movement of the pinion 23. From the above it will be apparent that the rotation of the crank gear 21 will alternately raise and lower the traveler 13 carrying the former for shaping the articles being molded, while the former is simultaneously rotated through the bevel gears 9 and 10. The former may be maintained in engagement with the articles being molded while the connecting rod and associated parts continue their travel by reason of the play permitted the connecting rod against the tension of the spring 18.

The mold supporting mechanism will now be described. A bracket 27 is bolted upon the front of the casing 5 and is provided with an apertured table for the reception of the vertically disposed mold shaft 28 carrying at its upper extremity the rotatable mold supporting plate 29 (note Fig. 3). The mold supporting plate 29 is provided with a series of circumferentially spaced apertures 30 adapted to receive the bosses 31 of a series of molds 32 shaped to any desired configuration and secured, as by the mold screws 33, upon the upper face of the mold supporting plate. The apertures 30 of the mold plate are so disposed that the orbit of their vertical centers align with the vertical center of the former carried upon the forming shaft 11, whereby the accurate positioning of the molds relatively to the former is simplified.

The several molds 32 are automatically brought into position beneath the former by the rotation of the mold supporting plate 29 by the following mechanism. A ratchet wheel 34 is fixed upon the mold shaft 28 adjacent its lower extremity (note Figs. 3 and 4) and co-operate with the spring-pressed pawl 35 for moving the mold shaft through a partial revolution whenever the pawl is thrown. The pawl 35 is slidably mounted in the frame 36 sleeved upon the lower extremity of the shaft 28 and carrying a depending pin 37 connected to one extremity of the link 38. The opposite extremity of the link 38 is pivotally connected to the crank arm 39 fixed upon the stub shaft 40 (see Fig. 1), which shaft also carries the crank arm 41 pivotally connected to one extremity of the link 42, the other extremity of which is pivoted to the forwardly projecting bracket arm 43 of the traveler 44 mounted for vertical movement in a slot 45 formed in the lower portion of the casing 5 (note Fig. 2). The traveler 44 also carries a rearwardly projecting abutment member 46 adapted to be periodically engaged by the forward extremity of the crank pin 20 during the revolution of the crank gear 21. The abutment member 46 is preferably adjustably mounted on the traveler 44 to vary the time of contact in each revolution of the crank gear with the crank pin 20. As best shown in Fig. 5 this adjustment may consist in pivoting one extremity of the abutment member, as at 47, and arranging a pair of adjusting screws 48 for engagement with the opposite extremity of the abutment member so that the rotation of the respective screws will force the free end of the abutment member in opposite directions.

By virtue of this construction the mold supporting plate 29 is partially rotated during each revolution of the crank gear 21, the engagement of the crank pin 20 with the abutment member 46 serving to elevate the traveler 44 and through the link 42 and crank arm 41 rock the shaft 40 through an arc proportionate to the extent of upward movement of the traveler 44. The rocking of the shaft 40, through the arm 39 and link 38, serves to move the pawl carrying frame 36 tangentially of the ratchet wheel 34, whereby the ratchet wheel and mold shaft are partially rotated proportionately to the movement of the frame 36. As the traveler 44 returns to its normal position the pawl 35 rides over the nearest ratchet against the tension of its spring, and automatically seats itself in position for again partially rotating the ratchet wheel and mold shaft when the traveler 44 is again contacted by the crank pin 20. The fall of the traveler 44 is regulated by an adjustable stop member 49 (note Fig. 1) arranged to be engaged by the bracket portion 43 of the traveler at the lowermost point of its travel.

As best illustrated in Figs. 2 and 3, means are provided for automatically ejecting the formed articles from the molds during the rotation of the mold plate 29. As herein illustrated, each of the apertures 30 receive a vertically movable carrier 50 apertured at its upper extremity to receive the depending shank 51 of the ejector, the upper extremity 52 of which is shaped to fit the lower portion of the mold 32. Pins 53 or other suitable means may be employed for locking the ejectors in the carriers 50. Extending outwardly from each of the carriers 50 is a pin 54 surrounded by a rotatable sleeve 55 arranged to ride in a cam groove 56 in the circular guide plate 57 bolted to the upper face of the bracket 27, as by the bolts 58. The cam groove is preferably so shaped that its lowermost portion is under the former and shaft 11, whereby the ejector mechanism will not interfere with the action of the former and mold in shaping the desired article, then as the mold plate 29 is rotated, the ejector mechanism is elevated by riding up an inclined portion of the cam groove to elevate the formed article and hold it with its upper extremity above the top of the mold. The groove may then hold the ejector mechanism elevated until the rotation of the mold plate brings the mold again adjacent the position beneath the former mechanism, whereupon an inclined portion of the groove leads the ejector and associated parts downwardly as desired.

This improved ejecting mechanism permits the ready removal of the formed articles and the introduction of new plastic material to the molds at a distance from the rotating former, whereby all danger of accident to the operator is removed, and increased speed in molding plastic articles may be attained. The placing of the cam groove in the circular plate 57 surrounding the mold plate permits the same mechanism utilized for rotating the mold plate to control the operation of the ejecting mechanism.

To permit the ready assembly of the carriers 50 into the apertures 30 in the mold plate, I preferably construct the circular plate 57 in two sections, one of which can be readily removed, and construct the mold plate with the lower portion of the apertures 30 open at the periphery of the plate. By virtue of this construction the carriers 50 may be introduced into the apertures 30 and the shank 51 of the ejector then lowered into the carrier and locked in position by the pin 53. Then the mold plate is turned to bring the next aperture 30 into alignment with the detached portion of the plate 57 and the next carrier inserted. During this rotation of the mold plate each sleeve 55 is positioned within the cam groove and thereafter will ride upon the lower surface of the groove.

An automatic brake 60 is preferably provided to resist the tendency of the mold plate 29 to turn when the spinning former is in contact with one of the molds. As herein shown a cylinder 61 is bolted upon the bracket 27 in horizontal alignment with the mold plate 29 (see Fig. 1) and houses a coil spring 62 bearing at its extremities against the rear wall of the cylinder and a collar upon the rod 63 carrying the brake shoe 64 normally contacting the periphery of the mold plate. The tension of the spring 62 may be varied by turning the adjusting nut 65 so that the brake shoe will prevent accidental rotation of the mold plate but will not impede the rotation of the mold plate under the impulse given when the crank pin 20 engages the traveler 44, as hereinbefore described.

A belt shifting lever 66 is preferably mounted on the casing 5 in position for convenient shifting of the drive belt to and from the pulleys 25 and 26.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

Having described my invention, I claim—

1. In a molding machine, the combination of a rotary mold supporting plate, a former vertically movable toward and away from the plate, means for intermittently rotating the plate while the former is being moved away from the plate, including a mold shaft to which said plate is secured, a ratchet wheel fixed on the shaft, a pawl contacting the ratchet wheel, means for moving the pawl tangentially of the ratchet wheel, including a rock shaft having a pair of arms thereon, a link connecting one of said arms with said pawl, a link connecting the other of said arms with a vertically movable traveler, and means for lifting the traveler simultaneously with the upward movement of said former.

2. In a molding machine, the combination of a rotary mold supporting plate, a former vertically movable toward and away from the plate, means for intermittently rotating the plate while the former is being moved away from the plate, including a mold shaft to which said plate is secured, a ratchet wheel fixed on the shaft, a pawl contacting the ratchet wheel, means for moving the pawl tangentially of the ratchet wheel, including a rock shaft having a pair of arms thereon, a link connecting one of said arms with said pawl, a link connecting the other of said arms with a vertically movable traveler, means for lifting the traveler simultaneously with the upward movement of said former comprising a crank gear carrying a crank pin in position to periodically engage said traveler, and a connecting rod intermediate the crank pin and former.

3. In a molding machine, the combination of a rotary mold supporting plate, a former, means for vertically reciprocating the former toward and away from the plate, means for intermittently rotating the plate simultaneously with the upward movement of the former, a stationary guide plate arranged adjacent the mold supporting plate, and means under control of the guide plate for ejecting the formed articles during the rotation of the plate.

4. In a molding machine, a rotatable mold supporting plate having a plurality of circumferentially spaced apertures therein, a series of molds adapted to seat in said apertures, a former reciprocable above the plate, means for intermittently rotating the plate to successively bring the molds into vertical alignment with the former, a grooved guide plate fixed concentrically with the mold supporting plate, and means under the control of the guide plate for ejecting the formed articles from the molds after their engagement with the former.

5. In a molding machine, a rotatable mold supporting plate having a plurality of circumferentially spaced apertures therein, a series of molds adapted to seat in said apertures, a former reciprocable above the plate, means for intermittently rotating the plate to successively bring the molds into vertical alignment with the former, and means for automatically ejecting the formed articles in certain of the molds and maintaining them in ejected position while other molds are receiving the former, including a stationary guide plate having a cam groove therein and ejectors extending into the molds and carrying members adapted to ride in said groove.

6. In a molding machine, a rotatable mold supporting plate having a plurality of circumferentially spaced apertures therein, a series of molds adapted to seat in said apertures, a former reciprocable above the plate, means for intermittently rotating the plate to successively bring the molds into vertical alignment with the former, means under the control of the plate for ejecting the formed articles from the molds after their engagement with the former, including a carrier slidably mounted in each of said apertures, an ejector secured to the carrier and extending into the mold, a pin extending laterally from the carrier into a cam groove located adjacent the mold plate, and a fixed plate having a cam groove for receiving the lateral pins on said carriers.

7. In a molding machine, a rotatable mold supporting plate carrying a series of molds, a reciprocable former adapted to successively enter the molds, means for spinning the former, means for intermittently rotating the plate, and a brake maintained in continuous frictional contact with the surface of the mold supporting plate and arranged to hold the plate against accidental rotation during the engagement of the spinning former and molds.

8. In a molding machine, a rotatable mold supporting plate carrying a series of molds, a reciprocable former adapted to successively enter the molds, means for spinning the former, means for intermittently rotating the plate, a brake arranged to hold the plate against accidental rotation during the engagement of the spinning former and molds, comprising a spring pressed brake shoe maintained in continuous frictional contact with the periphery of the plate, and means for regulating the tension of said spring pressure.

In witness whereof I hereunto set my hand.

ANDREW BAIRD.